US008538833B2

(12) United States Patent
Dance et al.

(10) Patent No.: US 8,538,833 B2
(45) Date of Patent: Sep. 17, 2013

(54) METHOD FOR ESTIMATION OF A PAYMENT FOR AN EXISTING REPORT BASED ON SUBSEQUENT REPORTS WHICH PROVIDES INCENTIVES FOR REPORTERS TO REPORT TRUTHFULLY

(75) Inventors: Christopher R. Dance, Grenoble (FR); Onno Zoeter, Grenoble (FR); Yu-An Sun, Webster, NY (US); Venkatesh Rao, Arlington, VA (US)

(73) Assignee: Xerox Corporation, Norwalk, CT (US)

( * ) Notice: Subject to any disclaimer, the term of this patent is extended or adjusted under 35 U.S.C. 154(b) by 651 days.

(21) Appl. No.: 12/695,757

(22) Filed: Jan. 28, 2010

(65) Prior Publication Data

US 2011/0184818 A1    Jul. 28, 2011

(51) Int. Cl.
*G06Q 99/00*    (2006.01)

(52) U.S. Cl.
USPC ............... 705/26.7; 705/347; 705/14.19

(58) Field of Classification Search
USPC ............................................. 705/16; 370/252
See application file for complete search history.

(56) References Cited

U.S. PATENT DOCUMENTS

| 6,542,905 | B1 * | 4/2003 | Fogel et al. ................. 1/1 |
| 6,957,227 | B2 * | 10/2005 | Fogel et al. ................. 1/1 |
| 8,341,075 | B2 * | 12/2012 | Coleman ....................... 705/38 |
| 2008/0137550 | A1 * | 6/2008 | Jurca et al. ............... 370/252 |
| 2009/0199185 | A1 * | 8/2009 | Slawson et al. ............ 718/100 |
| 2012/0059931 | A1 * | 3/2012 | Graupner et al. .......... 709/224 |

OTHER PUBLICATIONS

U.S. Appl. No. 12/331,677, Rao.
U.S. Appl. No. 12/331,740, Rao.
Balkundi, et al. Ties, Leaders, and Time in Teams: Strong Inference about Network Structure's Effects on Team Viability and Performance, Academy of Management Journal, 2006, vol. 49, No. 1.
Blackhall, et al. Recursive Sparse Estimation using a Gaussian Sum Filter, Proceedings of the 17th World Congress—the International Federation of Automatic Control, Jul. 6-11, 2008.
Bröcker, et al. Scoring Probabilistic Forecasts: The Importance of Being Proper, Jun. 15, 2006.
Bucklin, et al. Individual monetary incentives: A review of different types of arrangements between performance and pay. Journal of Organizational Behavior Management, 21(3):45-137, 2001.
Danilov, et al. On the Estimation of a large Bayesian system: the Snaer program, Feb. 2007.
Dawid, A. P. The geometry of proper scoring rules, Research Report No. 268, Department of Statistical Science, University College, London, Apr. 2006.
Fagin, et al. a formula for incorporating weights into scoring rules, Theoretical Computer Science 239, pp. 309-338, 2000.

(Continued)

*Primary Examiner* — Scott Zare
*Assistant Examiner* — Talia Crawley
(74) *Attorney, Agent, or Firm* — Fay Sharpe LLP (57) ABSTRACT

A method and apparatus for paying for an existing report are provided. In the method, an existing report for which a first structure of entities is identified is received. Thereafter, a set of other reports for which respective second structures of entities are identified is received. A weighting for other reports in the set of other reports is assigned, based on the respective structures. A payment for the existing report is extracted based on the weighting, a selected scoring rule, and the set of other reports.

24 Claims, 2 Drawing Sheets

(56) References Cited

OTHER PUBLICATIONS

Garthwaite, et al. Statistical methods for eliciting probability distributions. Journal of the American Statistical Association, 100(470):680-700, 2005.
Glickman, M.E. Dynamic paired comparison models with stochastic variances. *Applied Statistics*, vol. 28, No. 6, 673-689, 2001.
Gneiting, et al. Strictly proper scoring rules, prediction, and estimation. Journal of the American Statistical Association, 102(477):359-378, 2007.
Hanson, R. Eliciting Objective Probabilities via Lottery Insurance Games, 1993 (available at http://hanson.gmu.edu/elicit.pdf).
Hanson, R. Logarithmic Market Scoring Rules for Modular Combinatorial Information Aggregation, Jan. 2002 (available at http://hanson.gmu.edu/mktscore.pdf).
Hanson, et al. A Manipulator Can Aid Prediction Market Accuracy, Mar. 2004 (available at http://hanson.gmu.edu/biashelp.pdf).
Herbrich, et al. TrueSkill (TM): A bayesian skill rating system. In Advances in Neural Information Processing Systems 20, 2007.
Laibson, D. Golden eggs and hyperbolic discounting. *Quarterly Journal of Economics*, 112(2):443-77, 1997.
Lambert, et al. Eliciting properties of probability distributions. Proceedings of the 9th ACM Conference on Electronic Commerce(*EC*), pp. 129-138, 2008.
Lambert, et al. Eliciting truthful answers to multiple-choice questions. In *EC*, 2009.
Lee, et al. Product distribution theory for control of multi-agent systems, Proceedings of the Third International Joint Conference on Autonomous Agents and Multi-agent Systems—vol. 2, Jul. 19-23, 2004.
Liang, et al. Performance Evaluation of Rating Aggregation Algorithms in Reputation Systems, 2005 International Conference on Collaborative Computing: Networking, Applications and Worksharing.
Miller, et al. Eliciting informative feedback: The peer-prediction method. *Management Science*, 51, 2005.
Morgeson, et al. Selecting Individuals in Team Settings: The Importance of Social Skills, Personality Characteristics, and Teamwork Knowledge, Personnel Psychology, 58, 583-611, 2005.
Offerman, et al. A truth-Serum for Non-Bayesians: Correcting Proper Scoring Rules for Risk Attitudes, Review of Economic Studies, vol. 76, Issue 4, pp. 1461-1489, Oct. 2009.
Volmer, J. Individual Expertise and Team Performance: Results of Three Empirical Studies, Ph. D. Dissertation, 2006.
Witkowski, J. Eliciting Honest Reputation Feedback in a Markov Setting, Proceedings of the 21th International Joint Conference on Artificial Intelligence (IJCAI) Jun. 2009.
Woolley, et al. Bringing in the experts: How team composition and collaborative planning jointly shape analytic effectiveness. *Small Group Research*, 39(3):352-371, 2008.

* cited by examiner

METHOD FOR ESTIMATION OF A PAYMENT FOR AN EXISTING REPORT BASED ON SUBSEQUENT REPORTS WHICH PROVIDES INCENTIVES FOR REPORTERS TO REPORT TRUTHFULLY

CROSS-REFERENCE TO RELATED PATENTS AND APPLICATIONS

The following co-pending applications, the disclosures of which are incorporated in their entireties by reference, are mentioned:

U.S. application Ser. No. 12/331,677, filed Dec. 10, 2008, entitled METHOD AND SYSTEM FOR CREATIVE COLLABORATIVE MARKETPLACES, by Venkatesh G. Rao; and U.S. application Ser. No. 12/331,740, filed Dec. 10, 2008, entitled METHOD AND SYSTEM FOR CREATIVE COLLABORATIVE MARKETPLACES, by Venkatesh G. Rao.

BACKGROUND

The exemplary embodiment relates to incentive compatible machine learning and, in particular, to the estimation of payments for reports. It finds application in connection with assessment of the value of an existing report based on subsequent reports.

Online sites today sometimes offer mechanisms for reporting on workers, services, friends, products, or media along multiple dimensions, such as reliability, quality of service and friendliness. However several issues can undermine such reporting mechanisms, notably underprovisioning and dishonest reporting. Underprovisioning is the notion that may not be worthwhile for a reviewer to spend much effort constructing a detailed and honest report unless the reviewer is rewarded for it. Dishonest reports can arise when payments are made for reports. Even if reports are filtered for low-effort, nonsense reports, it can be possible to obtain higher payments by carefully-constructed dishonest reports.

Recently, peer prediction methods have been proposed to attempt to overcome these issues. These methods make payments for a report on the basis of how well the report predicts other reports, while maintaining a posterior belief about the distribution of reports. The payments need not be in terms of money, but can be other tokens such as "rating points" with perceived value or "lottery tickets" with ex-ante value. Payments in terms of money can be handled in many ways, such as transfers between raters or reductions in commission.

Miller, et al. identify some peer prediction methods that have useful properties such as individual rationality (payments can be made large enough to overcome underprovisioning); incentive compatibility (honest reporting achieves maximal payments for a rater, assuming that other raters are reporting honestly). (See Nolan Miller, Paul Resnick, and Richard Zeckhauser, Eliciting informative feedback: The peer-prediction method. *Management Science*, 51, 2005).

Private values for dishonest reports can still bias such mechanisms. Private values arise for numerous reasons. Sometimes, a rater prefers to be nice, to avoid confrontation or to ensure that others will have a positive impression of them as a rater. In some cases, a rater is a friend of a worker being rated and wishes them to find jobs more easily in future. As another example, a buyer on an online auction site gives a seller that they are happy with a bad rating in order to reduce bids for that seller's future offerings, in order to obtain those offerings more cheaply for themselves.

Thus the actual extent to which a peer prediction method results in honest reporting depends on how the payments are scaled to outweigh these private values.

Other problems exist with rating mechanisms as follows. Whitewashing: a rated entity who has achieved a bad rating might recover a default rating by reincarnating their identity. This can be limited by charging fees for joining the rating mechanism. Collusion: several raters may agree with each other to give dishonest reports in order to maximize their payments. It is generally the case that when a large fraction of raters colludes, there are no mechanisms that can induce truthfulness. However auditing and threats of legal action can be effective. Unravelling: if an item is rated by a string of people, whose incentive payments depend on future ratings, the final raters will have no-one to incentivize them. Therefore they may be dishonest. The same argument then applies recursively to the previous raters. This can be addressed by scrambling the order in which reports are displayed and used. Variable point of view: different raters may have different rating abilities or perspectives on rated entities. Thus payment rules which depend on assumptions that true ratings come from one probability density will tend to look on such raters as dishonest, and therefore penalize them. Observation quality: human judgements of means degrade when data is highly skewed and judgements of variances and properties of tails of distributions suffer serious misconceptions. (See P. Garthwaite, J. Kadane, and A. O'Hagan, Statistical methods for eliciting probability distributions, *J. Am. Statistical Assoc.*, 100(470):680-700, 2005) Thus, the meaningfulness of reports is limited and care must be taken in deciding what to request from a report. Risk aversion: some scoring rules may result in arbitrarily large payments.

The problems of peer prediction are increased where reports relate to combinations of persons (or more generally, entities) and forecasts of future reports are sought for previously unseen combinations of entities. For example, a report may be sought for a job executed by a team of individuals who have not previously worked together or for a contractor who is using a new set of subcontractors. One field where this arises is in MicroWork-division of work into relatively fine-grained tasks ("microtasks"), as well as distribution of the microtasks to MicroWork providers. MicroWork customers may specify one or more microtasks for an overall processing task, such as the creation of electronic documents, and may register or publish the microtasks at a computerized MicroWork broker, e.g., one maintained by a MicroWork service provider. MicroWork providers review the microtasks published at the MicroWork broker, and may bid for and complete microtasks in exchange for compensation, for example, as specified by the microtask. The MicroWork customer may solicit and receive an initial report on the team of MicroWork providers that the customer has selected for the processing task. In order to determine how much to reward the reporter for the initial report, the customer may want review one or more subsequent reports.

The exemplary embodiment provides a method and system for determining a reward to optimize the value of a report on a team to the customer.

INCORPORATION BY REFERENCE

The following reference, the disclosure of which is incorporated herein in its entirety by reference is mentioned: U.S. Pub. No. 2009/0199185, published Aug. 6, 2009, entitled AFFORDANCES SUPPORTING MICROWORK ON DOCUMENTS, by Slawson, et al., discloses a method to facilitate trust and collaborative efficiency, particularly in the context of large public microwork brokers, where public reputations may be maintained for microwork participants by the microwork broker. To further enhance microwork efficiency, distinct reputations may be maintained with respect to particular microwork categories.

BRIEF DESCRIPTION

In accordance with one aspect of the exemplary embodiment, a method for paying for an existing report includes receiving an existing report for which a first structure of entities is identified. Thereafter, a set of other reports are received for which respective second structures of entities are identified. A weighting is selected for other reports in the set of other reports based on the respective structures. A payment for the existing report is extracted, based on the weighting, a selected scoring rule, and the set of other reports. One or more of the weighting selection and payment extraction may be performed by a computer processor.

In another aspect, an apparatus includes a report evaluation component, which includes an extraction component for extracting information from a set of input reports including an existing report for which a payment is to be extracted and other reports received at various times after the existing report, the information comprising a structure of a team and a ranking for the team. A weighting component determines a weighting for at least a subset of the other reports, based, at least in part, on the extracted information. A truth signal-to-noise ratio (TSNR) computation component is configured for determining a value for a TSNR for at least a subset of the received other reports. A stopping point determination component determines whether a stopping point has been reached, based on the computed TSNR value. A payment computation component determines a payment to be made for the existing report, by application of a stored payment rule, when the stopping point is reached. At least one computer processor implements the report evaluation component.

In another aspect, a method for paying for an existing report includes receiving an existing report rating the work of a team for which members of the team are identified, thereafter, receiving over time, a set of other reports, each for the work of a second team, at least one of the second structures differing in the identities of its team members from the first report. A time to make a payment is determined, based on a value of a truth signal to noise ratio (TSNR) for at least a subset of the reports received, which optimizes a tradeoff between timeliness, variability, and truth inducing character of payments. A payment for the existing report based on the selected scoring rule and the set of other reports.

In another aspect, a reporting method includes (i) receiving a time sequence of rating reports, (ii) determining a payment time for making an incentive payment for an existing report of the time sequence of rating reports including: (ii)(a) receiving a later report of the time sequence of rating reports subsequent to the receiving of the existing report, (ii)(b) computing an accuracy metric for peer prediction-based truthfulness assessment of the existing report, the computing operation (ii)(b) being based at least in part on the later report, and wherein at the payment time the accuracy metric satisfies a stopping criterion, and computing a payment for the existing report at the payment time.

DETAILED DESCRIPTION

It is recognized herein that a substantial problem in incentive payment subsystems of reporting systems that employ a peer prediction-type analysis is that there is a tradeoff between: (i) the time latency between submitting the report and receiving payment and (ii) collection of sufficient information to make an appropriate payment. If the time latency is short, then the number of reports on which the payment is based is small and the payment may not accurately reflect the value (e.g., truthfulness, completeness) of the report. On the other hand, if the time latency is long, then the reporter may receive the payment so late that it is substantially devalued (at least in the view of the reporter). In the case of multi-entity reporting (e.g., rating) mechanisms, additional issues can arise, since different reports may be submitted for different combinations of persons or entities. Improvements addressing these problems in incentive payment systems are set forth herein. Toward this end, the following terms and concepts are defined.

1. Truth-Signal: Consider a report for a team $\{A, B, C\}$ that is paid on the basis of a report for a team $\{D, E, F\}$, where A, B, C, D, E, and F are different entities. While this payment may satisfy conditions leading to incentive compatibility in general peer prediction, the relationship between the payment and the report may be too weak to effectively overcome bias due to private values for reports.

2. Truth-Noise: To strengthen the relation between the payment and report, payment may be made on the basis of a large number of future reports. However, there may be a lot of variation in those future reports, which could add a lot of variation to the payment. This is particularly undesirable when some reporters do not trust the system. For example, those who receive a low or negative payment, having spent some effort to produce a detailed and truthful report may feel cheated and avoid future interaction with the system, or even engage in vengeful behaviours; while those who receive a positively rewarding payment having produced a thoughtless, lying report may view this as an incentive to continue lying. In studies of the relation between monetary incentives and work performance, workers who receive arbitrary payments for their work tend to be demoralized (see B. Bucklin and A. Dickinson, Individual monetary incentives: A review of different types of arrangements between performance and pay, *J. Organizational Behavior Management*, 21(3):45-137, 2001). Further, raters often have a need to understand the basis on which they are making or receiving a specific payment. If this basis involves a large number of other reports that are deemed to be of low relevance, it may be unacceptable. Thus, reduction in truth-noise should be attained parsimoniously.

3. Timeliness: To be as parsimonious as possible, a customer may pay for a report for $\{A, B, C\}$ on the basis of the report for the next job done by $\{A, B, C\}$. This would likely be a highly-relevant report. However, the team may not work together again for a long time, and, in an extreme case, that team might never work together again, so the payment mechanism can unravel. In general, as it is typical for reporters to discount future payments, earlier payments are more desirable.

The exemplary embodiment relates to a system and method for automatically determining when a payment for an existing report should be made, based on other reports and a scoring algorithm for determining the payment. In various aspects, the exemplary system and method extend peer prediction to settings where reports relate to combinations of entities and forecasts of future reports may be sought for previously unseen combinations. The exemplary method aims to provide buyers (or more generally, reporters) with appropriate incentives to report truthfully on the quality of the received work.

The exemplary embodiments can find general application in contexts where reports on different aspects of an overall probabilistic system are elicited by a customer from multiple reporters, some form of payments are made to or by the reporters on the basis of their reports, and there is a desire to balance the timeliness, variability, and truth-inducing characteristics of the payments to achieve an optimum outcome.

The system and method may find particular application in the context of future markets for MicroWork employing recursive auctions, as disclosed in above-mentioned U.S. patent application Ser. Nos. 12/331,677 and 12/331,740 by Venkatesh Rao. The work involved may be graphic design, translation, generation of documents, or the like, where a team performing the work (more generally, "a structure") may be made up of people who work remotely from each other. Typically, a buyer initiates the process with a call for proposals for work. Providers/contractors submit a bid together with a list of team members who will perform the work. The buyer may not have seen the work of that team before. However, reports on previous teams are available with respective ratings for the entire team. The buyer may generate a hypothetical report with a rating for the new team, based on reports provided on the work of prior teams, which allows the various bids to be assessed. The buyer receives a payment for his hypothetical report, based on subsequent reports of the new team's work. The present method allows an appropriate time for payment to the buyer to be computed, based on the subsequent reports, which provides a tradeoff between the timeliness of the payment, the buyer's incentive to produce a truthful report, and the variability of the payments.

As used herein, an "existing report" refers to a report for which a payment is to be computed.

"Other reports" refer to reports received, other than the existing report, which may be used in computing the timing and/or value of the payment from the customer to the reporter providing the existing report. In some embodiments a subset of other reports received is used in the computation. As will be appreciated, an "other report" can subsequently serve as an existing report which is evaluated against others of the other reports.

A "payment" can be in any form including but not limited to money, points, a change in a rating of the reviewer, a virtual bank account, which is not seen by any of the reviewers, or the like. In general, the payment is made by a customer to a reporter. In some embodiments, however, a payment can be negative, i.e., the reporter makes a payment to the customer, in the form of money, loss in points, reduction in rating, or the like.

The exemplary embodiment assumes that a payment rule is specified before the reports are solicited (the payment rule may specify a payment which is some function of a scoring rule). Depending on what other reports an existing report is scored or paid for against, there will be a different sensitivity to different lies. A "truth signal" can be considered as the cost of the cheapest lie for the given payment rule. While better sensitivity can be obtained by scaling the payment, using more reports (data points) or using better reports, there are pros and cons with each option, as noted above.

Figure 1:
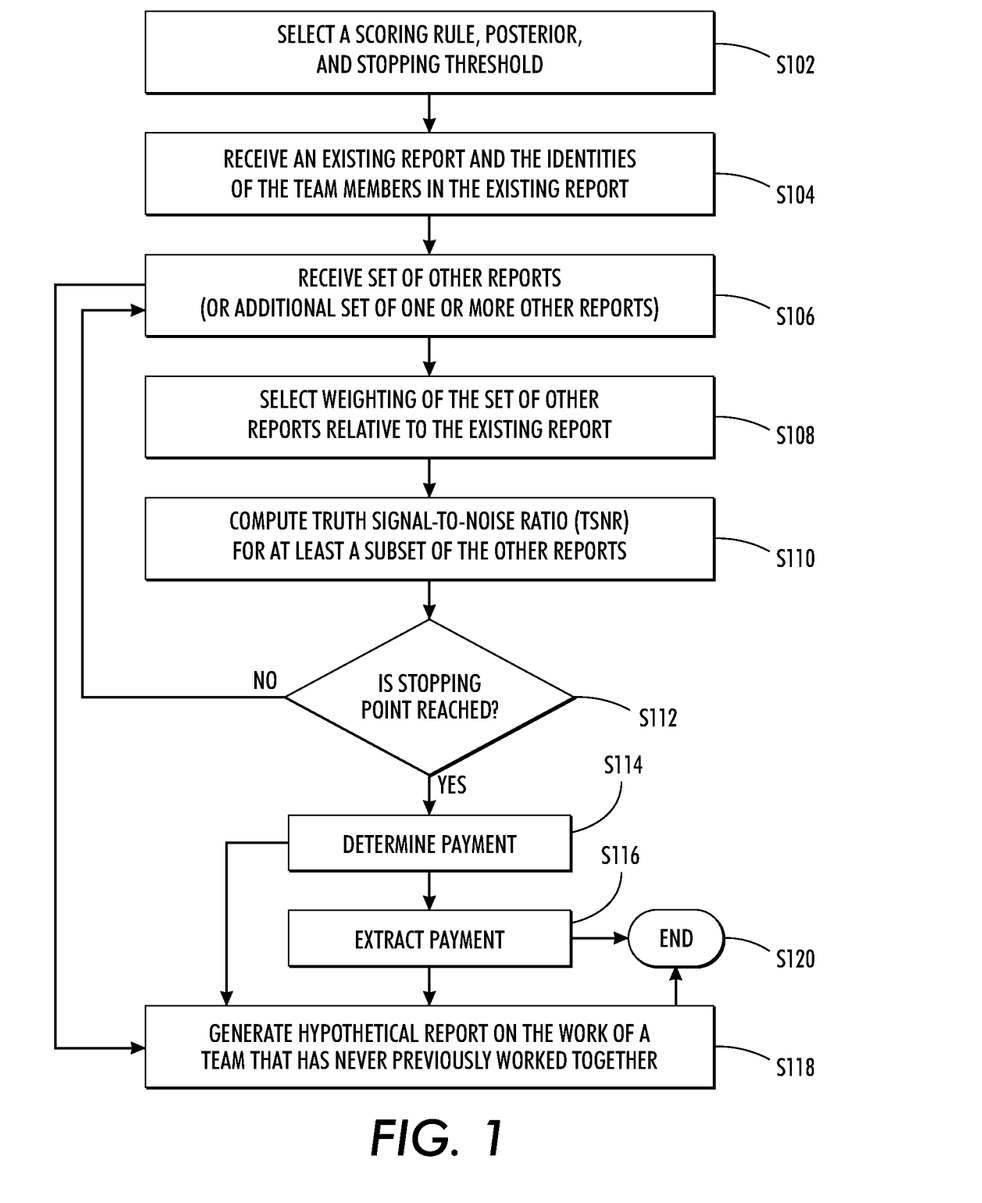
FIG. 1 is a flow chart illustrating a method for evaluating an existing report.

FIG. 1 illustrates an exemplary method of paying for an existing report about the work of a team. The method begins at S100.

At S102 a posterior, a scoring rule, and a stopping threshold $\tau_{s-t}$ are selected. These terms are described in further detail below. Briefly, the posterior is a probability distribution conditioned on the previous reporting history. The scoring rule is a mapping of elementary report events to suitable incentive units, such as monetary payments, points, or the like. The stopping threshold is a criterion based on a truth signal-to-noise ratio (TSNR) constructed from truth- and noise-signals, which is evaluated in order to determine when the payment for an existing report should be made.

At S104, an existing report $X_t$ is received from a first reporter. The corresponding structure $a_t$ for the report is also identified. The exemplary structure comprises a plurality of different entities, such as identities of team-members, although it is also contemplated that a report may be for a single entity.

At S106, a set of other reports is received from one or more second reporters. The other reports are generally received subsequent to receipt of the first report, such that the second reporter(s) may be aware of the content of the first report and/or have additional information to that of the first reporter on which to base the second report(s). Each other report $X_S$ has a corresponding structure $a_s$, each structure comprising one or more entities. The entities of one or more of the structures $a_s$ may differ from that of the structure $a_t$ for the existing report.

At S108, a weighting of the set of other reports relative to the existing report may be selected on the basis of the entities in the existing report and those in the later reports. For example, if there is a significant overlap between the structure of the other report and that of the existing report it is given a higher weighting than another report $X_S$ with less overlap. Other criteria may additionally or alternatively be used in the weighting.

At S110, a truth signal-to-noise ratio (TSNR) is computed for at least a subset S of the set of other reports. This may include identifying a subset S of the other reports that maximizes the TSNR $R_t(S)$.

Based on the computed (or maximum) TSNR, a determination is made as to whether a stopping point is reached (S112). If so, the method proceeds to S114, otherwise returns to S106 to await further reports.

The decision operation S112 provides a principled way to optimize the time latency between receiving the existing report $X_t$ and computing and making the payment, so as to balance the timeliness, variability, and truth-inducing characteristics of the payments to achieve an optimum outcome. The TSNR provides a metric of how well the truthfulness of the existing report $X_t$ can be assessed at the current time after submission of the existing report $X_t$. If the TSNR is "too low" based on comparison with the stopping threshold, then flow goes back to operation S106 in order to wait for further later reports upon which to base a more accurate assessment of the truthfulness of the existing report $X_t$.

At S114 a payment is computed for the existing report which is to be made to the first reporter. The payment for the existing report is computed on the basis of the weighting, the scoring rule and the set of reports $X_S$ and their structures $a_s$.

At S116, the payment may be made to the first reporter providing the existing report $X_t$ (or, in the case of a negative payment, received from the first reporter).

Optionally, at S118, a hypothetical report on the work of a team that has never previously worked together is derived. The hypothetical report may be used for ranking, pricing, a recommendation, or the like. This may be based on all reports received up to that point, with the TSNR computation and payments made up to that point helping to ensure the received reports are reliable. The hypothetical report may be based on a probabilistic model that predicts team performance as a function of team member performances derived from the received reports and possibly the observed background structure $a_t$. Any suitable probabilistic model can be used for predicting team performance. One suitable probabilistic model is set forth in Glickman (see M. E. Glickman, Parameter estimation in large dynamic paired comparison experiments, *Applied Statistics,* 48:377-394, 1999).

The method ends at S120.

However, it is contemplated that the method of FIG. 1 may be performed for each received report with the received report designated as the "existing report" $X_t$ in order to determine the optimal time for incentive payment for each received report. As a consequence, the method of FIG. 1 may be performed concurrently for a number of received reports as further reports are received so as to determine the optimal payment time for each received report.

In the exemplary method, the weighting selected at S108 may correspond to simply including or not including a given report in the payment.

In another embodiment, the weighting determined at S108 may depend on a truth signal. The truth signal may be computed as follows:

1) In the case of countable reports (e.g., ordinal or categorical), the truth signal may be based on a non-decreasing function of [[the expected scoring rule given any lie] minus [the expected scoring rule given any truth]], where expectations are taken on the basis of observations up to some time that is at least the time the existing report was submitted.

2) In the case of reports where it is meaningful to take second derivatives of a score with respect to the report, a form of the second derivative of [[the expected scoring rule given any lie] with respect to [the lie] evaluated at [the truth]].

In one embodiment, the weighting depends on a truth noise, which may be a non-decreasing function of a dispersion measure (variability) of the value of the scoring rule given a true report.

The existing report may be made by at least one buyer of a service from a team. Future prospective buyers may be shown some aggregate involving the existing report. The reports may relate to jobs executed by teams composed of varying sets of individuals.

At least one aspect of any report may be rating for the team. Other aspects may include a verbal summary of the team's work.

Under the payment scheme, truthful reporting by buyers of teamwork may be considered to be ex-ante Nash. Ex-ante Nash means (in this context) that the expected payments are predictably largest for the first reporter, assuming that the set of reports is truthful.

In this case, truthful corresponds to:

1) if the reporter assumes that previous reports are not lies, —reporting the requested summary in a manner that is closest to what the buyer expects others will perceive given what the buyer perceived;

2) if the buyer made previous lies in reporting, —reporting the requested summary that leads to the closest available system posterior on the future report density or distribution to what they believe.

As with existing peer-prediction ratings payment schemes, the exemplary method aims to result in incentive compatible ratings. It can also be implemented in a budget-balanced and individually rational fashion. By satisfying the mathematical conditions for a Nash equilibrium, reporters are given an incentive to tell the truth. Thus, buyers (reporters) can be confident that truthfully reporting what they observed is the best thing for them to do. Prospective buyers can rely on the ratings to make informed decisions. Additionally workers (entities) who deliver high-quality results will reliably increase their attractiveness to prospective buyers.

By exploiting the special characteristics of settings involving sequences of jobs executed by variably-composed teams, the exemplary method enables a trade-off between the timeliness, variability, and truth-inducing characteristics of payments.

The benefit of an automated rating aggregation system for teams may be larger than the benefit of automated aggregation systems for individuals, for at least two reasons. First, the task of manually aggregating past ratings data to assess a team may involve far more effort for a prospective buyer than the corresponding task of assessing ratings for an individual. Second, the typical risk associated with a team job can be larger than that associated with a job for an individual. For example, the average revenue for a team job may be larger than for an individual. Also, team jobs may involve workflows in which the failure of just one team member leads to a failure to achieve a quality target.

Methods for aggregating ratings for teams may also spawn additional markets for teamwork.

Various terms will now be defined.

Structure

In the exemplary embodiment, the structure $a_t, a_S$ is the composition (members, or more generally, entities) of the team for which the report is generated. Each structure $a_S$ can be different from $a_t$, i.e., differ in at least one of its entities, while having at least one of its entities in common with the structure $a_t$. Thus for example, if the existing report is from a team of entities A, B, and C (ABC), zero or more other reports may be for the same team ABC while one or more of the other reports may be for different teams AB, BC, BDE, ACD, ABCE, and so forth. The structure $a_t$, $a_S$ may be referred to in the report itself or may be otherwise known.

Other types of structure are also contemplated. For example one type of structure may be components for a machine, which in varying combinations, give different results.

Posterior

The posterior may correspond to a Bayesian probability distribution conditioned on the history up to the time of receipt of the existing report $X_t$ (that is, up to time t). It can be the best forecast of what the next rating will be given the ratings received up to now. The posterior can subsequently be updated by standard methods. When more data becomes available after calculating a posterior distribution, the posterior becomes the next prior.

Scoring Rule

Various scoring rules can be used. For example, given a probability triple (P, $\Omega$, F) where P is a probability measure, $\Omega$ is a space of elementary elements, and F is a set of elementary events, then a scoring rule is a function mapping events to real numbers and can be represented by:

$$S(\cdot|P):\Omega \to \mathbb{R}$$

where $\mathbb{R}$ represents a real number space having payment units (e.g., dollars, euros, or points).

The abbreviation $S(P|Q):\mathbb{E}_{\omega \sim P}[\mathcal{S}(\omega|Q)]$ is used to compare two distributions rather than an event and a distribution. $\mathbb{E}$ represents the expected value of a random variable, in this case, the random variable $\omega$, where $\omega$ represents a random variable distributed as P, and Q represents a distribution, in this case, a hypothesized distribution of events. $\mathcal{S}$ represents a proper scoring rule.

A suitable scoring rule is one in which the expected next value of an observed random variable is maximized when a report about a previous value of the random variable is equal to the actual value of the previous random variable. In the present case, a scoring rule is said to be proper if the expected payment is maximized when a reporter reports the truth. A proper scoring rule satisfies:

$$S(P|Q) \leq S(P|P)$$

for all distributions Q, and is strictly proper if equality is achieved only for Q=P. Many proper scoring rules are known, such as logarithmic, quadratic, and the like, and the exemplary method is not limited to any particular scoring rule. See, for example, T. Gneiting and A. Raftery, Strictly proper scoring rules, prediction, and estimation, J. Am. Statistical Assoc., 102(477):359-378, 2007.

The scoring rule chosen determines the payment made, as illustrated below. Some scoring rules do not allow negative payments, others permit them.

For example, peer prediction is a method, which,
given a proper scoring rule $\mathcal{S}$
given a posterior distribution $P(X_t|X_{s<t})$ for a report $X_t$ given a sequence of reports $X_{s<t}$
pays an amount for report $X_t$ of:

$$f(X_{t+1}|X_{s\leq t}) := \mathcal{S}(X_{t+1}|P(X_{t+1}|X_{s\leq t}))$$

The function $f(X_{t+1}|X_{s\leq t})$ is known as the payment rule.

The following definitions address situations where reports are associated with some externally given structures or covariates $a_t$. These structures may correspond to sets of team members and other data such as with whom the team members have previously worked. Correspondingly, the posterior and payment rule in peer prediction are augmented as $$P(X_t|X_{s<t}, a_{s\leq t}) \quad (1)$$

and $$f(X_{t+1}, a_{t+1}|X_{s\leq t}, a_{s\leq t}) := \mathcal{S}(X_{t+1}|X_{s\leq t}) \\ (X_{t+1}|P(X_{t+1}|X_{s\leq t}, a_{s\leq t}, a_{s\leq t+1})) \quad (2)$$

Stopping Threshold

A method for deciding when to extract a payment based on a value of a truth signal to noise ratio (TSNR).

Truth Signal to Noise Ratio

The truth signal $T_t(S)$ is defined as the mean penalty for telling the cheapest lie resulting in the given report. For a report $X_t$ with discrete-valued probability distribution and structure $a_t$ the truth signal for a set of further reports S is defined to be:

$$T_t(S) := \max_{y\neq X_t} \mathbb{E}\left[\sum_{s\in S} f(X_s, a_s | X_{r\leq t}, a_{r\leq t}) \,\Big|\, X_{r\leq t-1}, y, a_{\{r\leq t\}\cup S}\right] - \\ \mathbb{E}\left[\sum_{s\in S} f(X_s, a_s)|X_{r\leq t}, a_{r\leq t}) \,\Big|\, X_{r\leq t-1}, X_t, a_{\{r\leq t\}\cup S}\right]$$

For reports $X_t$ with continuous-valued probability density, it is possible to deviate infinitesimally with infinitesimal penalty. Furthermore, the expected payment is maximal at the true observation. Assuming that there is an interest in small deviations from truthfulness, for continuous-valued probability densities, the truth signal $T_t(S)$ can therefore be defined for future observations S in terms of the second derivative of the expected payment at the truth:

$$T_t(S) := -\frac{\partial^2}{\partial y^2}\mathbb{E}\left[\sum_{s\in S} f(X_s, a_s | X_{r\leq t}, a_{r\leq t}) \,\Big|\, X_{r\leq t-1}, y, a_{\{r\leq t\}\cup S}\right]_{y=X_t}$$

Where $X_s$ is the most recent report, $X_{r\leq t}$ is the sequence of reports up to and including $X_t$, and $X_{r\leq t-1}$ is the sequence of reports observed before $X_t$.

For vector-valued continuous reports, some directions of lying might be more important than others. The notion of the truth signal can be generalized to this case in multiple ways.

For example, a vector of positive weights w may be associated with the report. The truth signal may then be the weighted sum of squares of the diagonal of the Hessian of the expected payment at the truth:

$$T_t(S) := -\sum_{s\in S}\sum_i w_i \frac{\partial^2}{\partial y_i^2}\mathbb{E}[f(X_s, a_s | X_{r\leq t}, a_{r\leq t}) | X_{r\leq t}, a_{\{r\leq t\}\cup S}]_{y=X_t}$$

Choosing a set of reports S with a high truth signal may be undesirable as it may introduce a lot of variance to the payment. The expected variance of a payment given a true report is referred to as the truth noise:

$$V_t(S) := \mathbb{V}\left[\sum_{s\in S} f(X_s, a_s | X_{r\leq t}, a_{r\leq t}) \,\Big|\, X_{r\leq t}, a_{\{r\leq t\}\cup S}\right]$$

where $\mathbb{V}[Z]$ denotes the variance of Z $$\left(Z = \left[\sum_{s\in S} f(X_s, a_s | X_{r\leq t}, a_{r\leq t}) \,\Big|\, X_{r\leq t}, a_{\{r\leq t\}\cup S}\right]\right).$$

Note that both the truth signal $T_t(S)$ and truth noise $V_t(S)$ are functions of a set of "past reports" and structures of a set S of future reports. They do not depend on the actual values of those future reports. Indeed any selection of the set S that was based on the values of these reports could introduce a bias into the expected payment for S. Such a bias could result in a system that was not incentive compatible.

Finally, the truth signal-to-noise ratio (TSNR) is defined as the ratio of the (optionally squared) truth signal (the additional cost for the cheapest lie given a selected scoring rule) to the truth noise $V_t(S)$ (the variance of a payment given that the report is telling the truth, which is a function of the number of other reports S):

$$R_t(S) := \frac{T_t(S)^2}{V_t(S)}$$

Proper scoring rules remain proper under positive affine transforms (given by a positive multiplicative constant and an additive constant). Further, from the definition, the truth signal $T_t(S)$ scales linearly with the multiplicative constant and the truth noise $V_t(S)$ scales as the square of the multiplicative constant. Both are unaffected by the additive constant. Thus the TSNR is invariant to affine transforms of the payment rule. For example, payments in dollars vs. payments in Euros does not affect the TSNR. In some contexts, the square root of the TSNR ($\sqrt{\text{TSNR}}$) may be employed in place of the TSNR.

In the exemplary embodiment, the computed TSNR is used to balance the timeliness, variability and truth-inducing character of payments. Step S112 of the method employs an algorithm which waits until there is a subset of other reports that brings TSNR to a high-enough level and then makes or extracts a payment for an existing report. In one embodiment, a threshold TSNR is defined. In this embodiment, the method waits until the fixed TSNR threshold is reached.

In another embodiment, in order to make payments timely, the definition of "high-enough" depends also on the time elapsed since the existing report. For simplification, time elapsed may be counted in terms of the number of reports between the existing report $X_t$ and the most recent report $X_S$. Then "high-enough" is defined as a stopping rule which provides: "extract the payment when there is a subset $S \subset 2^{\{t+1,\ldots,s\}}$ of the set of other reports at times $\{t+1,\ldots,s\}$ for which the TSNR exceeds a threshold $\tau_{s-t}$". That is, stop the first time S that:

$$\max\{R_t(S) | S \subseteq 2^{\{t+1,\ldots,s\}}\} > \tau_{s-t}$$

Generally the stopping threshold $\tau_{s-t}$ will be non-increasing in time s–t when interest rates, and hence discounting, are positive.

In this embodiment, at S116, a payment is extracted that is a function, such as an affine transform of $\Sigma_{s \in S} f(X_s, a_s | X_{r \leq t}, a_{r \leq t})$ where $X_{r \leq t}$ is the sequence of reports observed before and at time t, and $a_{r \leq t}$ is its corresponding structure.

For example, the payment may be:

$$h(\Sigma_{s \in S} f(X_s, a_s | X_{r \leq t}, a_{r \leq t})) + j$$

where j is a minimum payment, which may be zero, and h is selected to be a suitable affine transformation. The decision on inclusion/exclusion of reports in the final set may be performed using TSNR, as exemplified in the Example below.

Without intending to limit the scope of the exemplary embodiment, an example of the application of the method is now described.

Example

As an example, consider a case involving reports with components that are multi-variate normals with known "observation noise." In this simplified example, the structures comprise team members, each of whose performance follows a normal probability distribution.

1. Posterior.

Assume reports $X_t$ are linear combinations $X_t = a_t^T Z_t$ of team-member performances $Z_t \sim N(\mu, \Sigma)$ with constant observation covariance matrix $\Sigma_X$, where $\mu$ represents the mean and where N represents the multivariate normal distribution, and $a_t^T$ represents known weighting coefficients of each team member's contribution to the team's performance. When the posterior on performance is $N(\mu_{t-1}, \Sigma_{t-1})$ a new report $X_t$ updates it to:

$$\mu_t(X_t) = \Sigma_t \left( a_t \sum_X^{-1} X_t + \sum_{t-1}^{-1} \mu_{t-1} \right),$$

$$\Sigma_t = \left( a_t \sum_X^{-1} a_t^T + \sum_{t-1}^{-1} \right)^{-1}.$$

These updates can be readily derived for a population of thousands of potential co-workers, since the matrices involved are highly sparse. For larger-scale problems, an overall market may be partitioned by categories of job-types and performance ratings are then given within each category.

2. Scoring Rule.

For a logarithmic scoring rule, for report $X_t$ when predicting $X_s$ for s>t, the scoring rule can be expressed by:

$$f(X_s | X_t) = -(X_s - a_s^T \mu_t(X_t))^T \sum_X^{-1} (X_s - a_s^T \mu_t(X_t))$$

$$= -\|X_s - a_s^T \mu_t(X_s)\|^2_{\Sigma_X}$$

up to an additive and a multiplicative constant.

3. Stopping Threshold.

A discount factor $\gamma \in (0,1)$ is selected and the stopping threshold is set to $\gamma^{s-t}$ for a report emitted at t and to be paid against reports up to and including s.

TSNR.

The expected score if y was really seen at t is:

$$\mathbb{E}_{\Sigma_t}[f(X_s | X_{r=t}) | X_{r \leq t-1}, y] = -\mathbb{E}[\|X_s - a_s^T \mu_t(X_s)\|^2_{\Sigma_X} | \mu_t(y), \quad (3)$$

Since $\mu_t(y)$ is linear in y, the Hessian of the expected score is:

$$H_{ij}(t,s) := \frac{\partial^2}{\partial y_i \partial y_j} \mathbb{E}[f(X_s | X_{r \leq t}) | X_{r \leq t-1}, y]$$

$$= -\frac{\partial^2}{\partial y_i \partial y_j} \mu_t(y)^T a_s \sum_X^{-1} a_s^T \mu_t(y)$$

$$= -\left[ \left( \sum_t a_t \sum_X^{-1} \right)^T a_s \sum_X^{-1} a_s^T \sum_t a_t \sum_X^{-1} \right]_{ij}.$$

For constant observation covariance $\Sigma_X$, the truth noise for each observation is a constant. Thus the truth noise for a set of reports is proportional to the number of reports involved.

Clearly, maximizing TSNR is equivalent to maximizing squared TSNR since the TSNR is non-negative. Thus, the maximization problem at S110 of the general procedure can be performed by maximizing:

$$T_t(S) := \frac{\sum_{s \in S} \sum_i w_i H_{ii}(t,s)^2}{|S|}$$

where a respective weighting w for the squared scores $H_{ii}(t,s)$ of each of the different components of the report may be used, as noted above. The value is normalized by dividing by the number of other reports considered (i.e., $|S|$). As noted above, this assumes that all reports are equally noisy. The noise is thus a function of the number of reports, i.e., the more reports considered, the higher the truth noise and the noisier the payment is. However, if there are few or no reports, the numerator cannot be big, so there is a tradeoff between truth signal and noise.

Maximizing TSNR

As an example, to optimize TSNR, reports are selected from the set to maximize their sum while minimizing the number of reports used. As each new report s comes in, the value of $v_s := \Sigma_i w_i H_{ii}(t,s)^2$ is determined. A representation of reports from $t+1,\ldots,s$ is maintained that is sorted so that $v_{s^{(1)}} \geq v_{s^{(2)}} \geq \ldots \geq v_{s^{(s-t)}}$. The maximizing for set S* (which is a subset of set S) at time s is clearly one which respects this ordering. Thus:

$$T_t(S^*) = \max_k \frac{\sum_{j=1}^k v_s(j)}{k} = v_{s^{(1)}}.$$

Where k is the number of new reports to be considered

This essentially defines how curved the payment function is around a true report. The payment is designed to give a maximum for a true report. However, if the function is highly curved, then any slight deviation from the truth can result in an expected payment which is much less.

As will be appreciated, when the solution of the objective function is obtained through an iterative process, a true maximum may never be achieved and the term "optimization" and "maximization" are intended to cover such cases where the method approaches but does not fully achieve a true optimal value.

Selecting the Stopping Threshold: Human Behavior and Incentive Mechanisms

Various methods for determining a stopping threshold can be used. The following hypotheses lead to a suitable approach to selecting a stopping threshold.

1. Hyperbolic discounting refers to weighting rewards at time t into the future in proportion to discount factor:

$$\gamma(t) := \frac{1}{1 + \alpha t}$$

where α is a discounting parameter reflecting the timescale and degree of discounting (e.g. α=1 if t is measured in years).

It may be noted that research on behavior has led to the conclusion that human discount functions are approximately hyperbolic rather than those functions conventionally applied in economics. (See D. Laibson, Golden eggs and hyperbolic discounting, in *Quarterly Journal of Economics*, 112(2):443-77, 1997). However, in other embodiments, a conventional discount function may be applied.

2. Liars should be penalized for lies of size δ by an amount p whereas those who tell the truth should not be penalized on average.

3. Reporting costs a rater some amount c of effort to produce. If it is paid for with amount $f_t(\delta)$ at time t after the rating, with a lie of magnitude δ, the effective utility of the rater under hyperbolic discounting is $\gamma(t)f_t(\delta)-c$. The issue of unraveling should also be noted. For instance, if a reporting system receives reports at too slow a rate, payments may be discounted to such an extent that they no longer sufficiently incentivize truthfulness or overcome under-provisioning.

4. Reporting costs and payments are small relative to a rater's overall wealth. Therefore, associated risks can be considered small, so a rater's utility can be considered locally linear.

5. There is some proportion π of the population who tells the truth, on average, and a proportion $\bar{\pi}$ of the population who lies, on average. Since ratings are stochastic, there is always some probability that a truth teller gets negative utility or a liar gets utility larger than −p. A rating system should get the right messages across, in the sense that this probability is minimized.

Formulating the objective J (in hypothesis 5 above) in terms of the stopping threshold gives:

$$J(\tau) := \pi \mathbb{P}\ (\gamma(\tau)f_\tau(0) \leq c) + \bar{\pi}\mathbb{P}\ (\gamma(\tau)f_\tau(\delta) \geq c - p) \quad (4)$$

Where $\mathbb{P}$ represents a probability density. The probability density is over all possible sequences of new reports following the report to be paid. Note that in this expression $\pi, \bar{\pi}$ can also be interpreted as the cost to the mechanism of each type of erroneous payment message, rather than population fractions.

The payment can then be expressed as:

$$f_\tau(\delta) := f_0 + f_1(\sigma_\tau Z_\tau + \mu_\tau(\delta)) \quad (5)$$

where $f_0$ is a given base payment, $f_1$ is a payment scale factor, $\sigma_\tau$ is the standard deviation of a proper scoring rule given new reports up to time t, $Z_\tau$ is a zero mean, unit variance random variable, as discussed above, and $\mu_\tau(\delta)$ is the mean payment for a lie of magnitude δ with $\mu_\tau(0):=0$. It can be assumed that $f_1 = \sigma_\tau^{-1}$ so that payments have unit variance, defining a natural scale for the payment system. The objective J is then:

$$J(\tau) = \pi \mathbb{P}(Z_\tau \leq \gamma(\tau)^{-1}c - f_0) + \bar{\pi}\mathbb{P}\left(Z_\tau \geq \gamma(\tau)^{-1}(c - p) - f_0 + \frac{\mu_\tau(\delta)}{\sigma_\tau}\right) \quad (6)$$

If time is discretized so that time for each report sequence is t∈{0, 1, 2, ... T}, an optimal threshold may be selected on the basis of n past report sequences and a known cumulative density Φ(Z) for the zero mean, unit variance random variable. Each such sequence i is associated with a TSNR sequence $R_t^i$. The empirical objective is then to minimize:

$$n\hat{J}(\tau) = \sum_{i=1}^{n} \sum_{t=1}^{T} \{R_{t-1}^i < \tau(t-1), R_t^i \geq \tau(t)\} C(t, R_t^i)$$

where:

$$C(t, R_t^i) := \pi \Phi(\gamma(t)^{-1}c - f_0) + \bar{\pi}(1 - \Phi(\gamma(t)^{-1}(c - p) - f_0 + R_t^i))$$

Since the TSNR sequence is non-decreasing, the optimal non-increasing stopping threshold rule satisfies a two-dimensional dynamic program with a value function v(t,τ). This rule can therefore be computed from the backwards recurrence:

$$v(t, \tau) = \min_{\tau' \leq \tau} \left\{ \sum_{i=1}^{n} \{R_{t-1}^i < \tau, R_t^i \geq \tau'\} C(t, R_t^i) + v(t+1, \tau') \right\}$$

Types of Report

Various types of report can be utilized in the exemplary method. Examples include one or more of:

1. Reports from multiple buyers at several levels of a hierarchy in a recursive auction for work.

2. Mixtures of reports on individual work components and team members, as well as reports on aggregate team performance.

3. Reports from team members about: how much they would like to work with the other team members in future, their perception of co-workers social skills, how motivated they felt, how enjoyable the task was, the nature of team planning that went on, combinations thereof or the like.

4. Mixtures of categorical, ordinal and continuous variables as well as such variables automatically extracted by sentiment mining techniques. "Star ratings" are a widely-used option.

5. Reports on confidence about other aspects of the report.

6. Multiple choice questionnaires.

In general, properties of a probability density can be elicited and how many subsequent observations are required to guarantee incentive compatibility (See N. Lambert, D. Pennock, and Y. Shoham, Eliciting properties of probability distributions, in Proc. 9th ACM Conference on Electronic Commerce (EC), pages 129-138, 2008).

Posterior Models

Features that may be incorporated in posterior models for evaluating teams can include.

1. How well do the skills of the team cover the needs of the job?
2. How connected is the buyer-co-worker network of the team? (e.g., has the team worked together before? have the members worked with the buyer? do team members have past co-workers in common even though they did not work together before?).
3. How well-rated is the best person working on each sub-task?
4. What fraction of revenue/importance is assigned to the individual's role?

Updating the Posterior

Exact posterior updates may not be feasible for some models. Many such approximations are known, such as:

1. Assumed density filtering and expectation propagation techniques (See, for example, M. E. Glickman, Parameter estimation in large dynamic paired comparison experiments. *Applied Statistics*, 48:377-394, 1999; and R. Herbrich, T. Minka, and T. Graepel, TrueSkill™: A bayesian skill rating system, in *Advances in Neural Information Processing Systems* 20, 2007).
2. Extended or fast Kalman filtering methods.
3. Sampling methods.

Alternative Ways of Maximizing the TSNR

It is advantageous for a rater to be rewarded on the reports of others rather than themselves. Thus, other reports by the person providing the existing report may be excluded from the set of other reports that are considered in maximizing the TSNR.

As previously noted, it is not necessary to maximize the TSNR exactly. In one embodiment, sampling from the other (future) reports may be performed in order that a rater cannot know in advance with whose reports they will be paired. This can reduce any potential benefits of collusion.

Rather than selecting a subset of reports to maximize the TSNR, in another embodiment, a weighting of the reports is used. Thus, reports of the person providing the existing report are considered but, because of the weighting, do not have as great an impact on the value of the TSNR as other reports. In the Gaussian case, weighting signals by their precision can lead to optimal SNR.

However, selecting reports rather than weighting them may be employed simply because this leads to payments that are easier to understand.

The method illustrated in FIG. 1, and described in further detail herein may be implemented in a computer program product that may be executed on a computer. The computer program product may include a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 1, can be used to implement the exemplary method for evaluating a report and extracting a payment.

Figure 2:
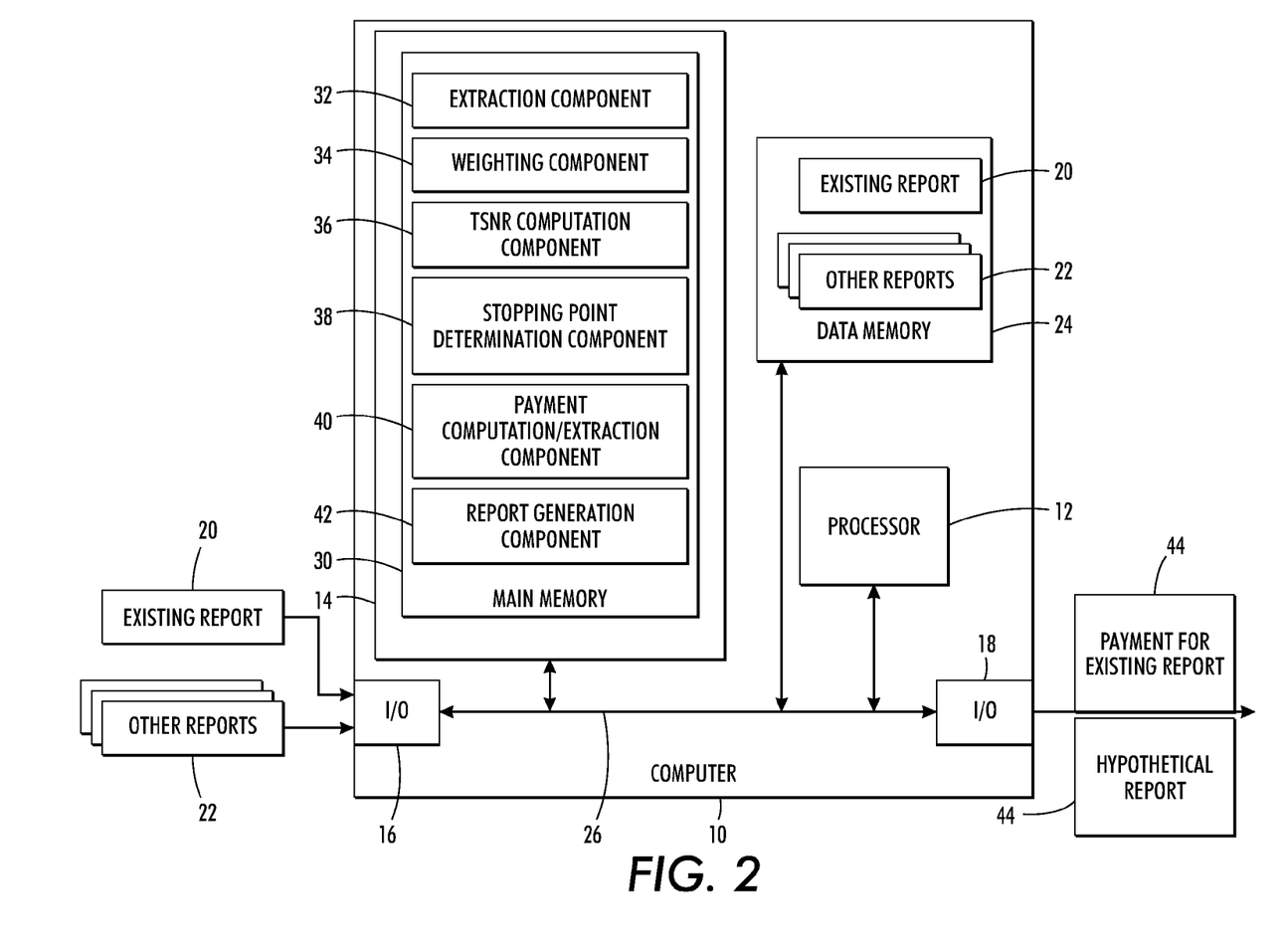
FIG. 2 is a functional block diagram of an apparatus for evaluating an existing report.

With reference to FIG. 2, a functional block diagram of a computer apparatus 10, configured for implementing the exemplary method, is shown. The illustrated computer apparatus includes a processor 12, which controls the overall operation of the computer apparatus 10 by execution of processing instructions which are stored in computer readable memory, such as main memory 14, which is communicatively linked to the processor 12. Computer apparatus 10 also includes an interface 16 and a user input output interface 18. Reports 20, 22, in electronic form, are received by the apparatus 10 via the interface 16 and stored in computer readable memory, such as memory 24, during processing. The I/O interface 18 may communicate with one or more output devices (not shown), such as a display, for displaying information to users, a printer, fax machine, or the like. The various components of the computer 10 may be all connected by a bus 26.

A report evaluation component 30 includes various components 32, 34, 36, 38, 40, 42 for performing the exemplary method, including an extraction component 32, for extracting information from the input reports, such as team members, rankings, reporter name (the author of the report), and the like. A weighting component 34 determines a weighting for an "other report" 22, based, at least in part, on the extracted information. A TSNR computation component 36 determines a value for the TSNR at various times, e.g., as new other reports are received. A stopping point determination component 38 determines whether a stopping point has been reached, based on the computed TSNR values. A payment computation component 40 determines a payment 44 to be made for the existing report 20, by application of a stored payment rule, as described above. Optionally, a report generating component 42 is configured for generating a hypothetical report 46 for a new or existing structure, based on the reports 20, 22.

The report evaluation component 30 and its sub-components may be embodied in hardware or a combination of hardware and software. For example, the component 30 may be in the form of software instructions stored in memory 14 or 24 and executed by computer processor 12. Specifically, the processor 12 executes instructions for performing the method outlined in FIG. 1. The computer apparatus 10 may be a PC, such as a desktop, a laptop, palmtop computer, portable digital assistant (PDA), server computer, cellular telephone, pager, or other computing device capable of executing instructions for performing the exemplary method.

The memory 14, 24 may represent any type of tangible computer readable medium such as random access memory (RAM), read only memory (ROM), magnetic disk or tape, optical disk, flash memory, or holographic memory. In one embodiment the memory 14, 24 comprises a combination of random access memory and read only memory. The digital processor 12 can be variously embodied in any suitable hardware, such as by a single-core processor, a dual-core processor (or more generally by a multiple-core processor), a digital processor and cooperating math coprocessor, a digital controller, or the like. The network interface 16 allows the computer to communicate with other devices via a computer network, such as a local area network (LAN) or wide area network (WAN), or the internet, and may comprise a modulator/demodulator (MODEM). Alternatively or additionally, interface 16 may comprise a port for receiving or coupling with a digital storage medium, such as a disk, flash memory, or the like.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for paying for an existing report comprising:

receiving an existing report for which a first combination of entities is identified, the existing report being generated for work performed by the first combination of entities;

thereafter, receiving a set of other reports for which respective second combinations of entities are identified, the other reports being generated for work performed by the respective second combinations of entities;

selecting a weighting for other reports in the set of other reports based on the respective second combinations of entities;

with a processor, computing an accuracy metric for peer prediction-based truthfulness assessment of the existing report, the accuracy metric being computed based on:

a) a function which gives reporters an incentive to report the truth given a selected scoring rule, b) a measure of variability of scoring by the selected scoring rule, assuming a true report; and c) at least a subset of the other reports; and making a payment for the existing report based on the weighting, the selected scoring rule, and the set of other reports at a time when the accuracy metric for at least a subset of the other reports exceeds a stopping threshold.

2. The method of claim 1, wherein the making of the payment is performed by a computer processor.

3. The method of claim 1, wherein the selection of the weighting includes excluding at least one of the set of other reports from the computing of the payment.

4. The method of claim 1, wherein the function which gives reporters an incentive to report truthfully is computed as:

1) a function of an expected value of the selected scoring rule given any lie minus an expected value of the selected scoring rule given any truth, where the expected values are taken on a basis of observations up to a time that is at least a time when the existing report was submitted, or 2) a function of a second derivative of an expected value of the selected scoring rule given any lie with respect to the lie evaluated at the truth.

5. The method of claim 1, wherein the entities of the first and second combinations of entities are team members of teams and the existing report and each report in the set of other reports relates to work of a respective team of team members.

6. The method of claim 5, wherein the existing report is provided by at least one buyer of a service from a team.

7. A computer-implemented method for paying for an existing report comprising:

receiving an existing report for which a first combination of entities is identified;

thereafter, receiving a set of other reports, a respective second combinations of entities being identified for each of the other reports in the set of other reports, each second combination of entities being different in composition of entities from the first combination of entities;

with a processor, selecting a weighting for one of the other reports in the set of other reports based on the second combination of entities of the one of the other reports; and making a payment for the existing report based on the weighting, a selected scoring rule, and the set of other reports.

8. The method of claim 1, wherein each report in the set of other reports includes a rating for a respective combination of entities and wherein the scoring rule is based at least in part on the ratings.

9. The method of claim 1, wherein the payment for the existing report is made when the stopping threshold is exceeded by at least a subset of the other reports.

10. The method of claim 1, wherein the accuracy metric optimizes timeliness, variability and truth inducing character of payments.

11. The method of claim 1, wherein reports in the set of other reports are received at different times and making a payment for the existing report is performed once a sufficient number of other reports is received for a subset of the set of other reports to have an accuracy metric which exceeds the stopping threshold.

12. The method of claim 1, wherein the making of the payment is not performed until there is a subset of the set of other reports for which the accuracy metric exceeds the stopping threshold.

13. The method of claim 1, wherein the stopping threshold assumes a hyperbolic discount factor for weighting rewards over time.

14. The method of claim 1, wherein the payment is also a function of a posterior distribution of reports prior to the existing report.

15. The method of claim 1, wherein:

a) the computing of the accuracy metric is performed at various times for at least a subset S of the set of other reports received up to time t; and further comprising:

b) determining whether a maximum value of the accuracy metric computed for at least one subset S of the set of other reports received up to time t exceeds a stopping threshold, and c) if so making the payment, otherwise waiting for at least one more other report in the set of other reports to be received and repeating steps a) and b).

16. The method of claim 1, wherein the payment made is a function of $\Sigma_{s \in S} f(X_s, a_s | X_{r \leq t}, a_{r \leq t})$ where s represents one of a set S of the other reports, and $f(X_s, a_s | X_{r \leq t}, a_{r \leq t})$ represents the selected scoring rule in which $X_s$ represents one of the set of other reports for which $a_s$ represents a respective combination of entities, and $X_{r \leq t}$ represents at least one report received before or at a time t for which $a_{r \leq t}$ is a corresponding combination of entities.

17. The method of claim 1, wherein the selected scoring rule permits both positive and negative payments to be made.

18. A computer program product comprising a non-transitory computer-readable recording medium encoding instructions, which when executed on a computer causes the computer to perform the method of claim 1.

19. An apparatus comprising:
instructions stored in memory for performing the method of claim 1; and
a processor in communication with the memory for executing the instructions and outputting a proposed payment for the existing report.

20. An apparatus comprising:
a report evaluation component comprising:
an extraction component for extracting information from a set of input reports including an existing report for which a payment is to be extracted and other reports received at various times after the existing report, the information comprising, for each of the input reports, members of a team and a ranking for the team, at least some of the other reports being for teams which differ in at least one member from the team for the existing report,
a weighting component which determines a weighting for at least a subset of the other reports, based, at least in part, on the extracted information,
an accuracy metric computation component configured to determine a value for an accuracy metric which determines how well the truthfulness of the existing report can be assessed at a time after submission of the existing report, the accuracy metric being computed based on:
a) a function which (lives reporters an incentive to report truthfully, based on a stored payment rule,
b) an expected variance of a payment (liven a true report, and
c) at least a subset of the received other reports;
a stopping point determination component which determines whether a stopping point has been reached, based on the computed accuracy metric value, and
a payment computation component which determines a payment to be made for the existing report, by application of a stored payment rule, when the stopping point is reached; and
at least one computer processor which implements the report evaluation component and computation component.

21. A computer-implemented method for paying for an existing report comprising:
receiving an existing report rating the work of a team for which members of the team are identified;
thereafter, receiving over time, a set of other reports, each of the other reports rating work of a respective second team for which members of the second team are identified, at least one of the second teams differing in team members from the team for the existing report, while having at least one team member which is the same as for the team for the existing report;
computing an accuracy metric for determining how well the truthfulness of the existing report can be assessed at a time after submission of the existing report, the accuracy metric being computed based on:
a) a function which gives reporters an incentive to report truthfully, given a selected scoring rule,
b) an expected variance of a payment given a true report, and
c) at least a subset of the reports received;
with a processor, determining a time to make a payment for the existing report based on the accuracy metric; and
making a payment for the existing report based on the selected scoring rule and the set of other reports.

22. A reporting method comprising:
(i) receiving a time sequence of rating reports;
(ii) with a processor, determining a payment time for making an incentive payment for an existing report of the time sequence of rating reports including:
(ii)(a) receiving a later report of the time sequence of rating reports subsequent to the receiving of the existing report,
(ii)(b) computing an accuracy metric for peer prediction-based truthfulness assessment of the existing report, the accuracy metric being computed based on:
a function which gives reporters an incentive to report the truth, given a selected scoring rule,
a measure of variability of scoring by the selected scoring rule assuming a true report, and the later report; and
wherein at the payment time the accuracy metric satisfies a stopping criterion; and
(iii) with a processor, computing a payment for the existing report at the payment time.

23. The reporting method of claim 22, wherein the accuracy metric is a function of a combination of entities providing the later report, wherein the combination of entities of the later report differs in at least one entity from a combination of entities of the existing report.

24. The method of claim 4, wherein $T_t(S)$ is computed as one of:

$$T_t(S) := \max_{y \neq X_t} E\left[\sum_{s \in S} f(X_s, a_s \mid X_{r \leq t}, a_{r \leq t}) \mid X_{r \leq t-1}, y, a_{\{r \leq t\} \cup S}\right] - E\left[\sum_{s \in S} f(X_s, a_s \mid X_{r \leq t}, a_{r \leq t}) \mid X_{r \leq t-1}, X_t, a_{\{r \leq t\} \cup S}\right]$$

where S is the set of further reports, $X_t$ is the existing report for a combination of entities $a_t$, $a_s$ is a combination of entities for a report s in S, $X_{r \leq t}$ represents a sequence of reports up to and including $X_t$, $X_{r \leq t-1}$ is a sequence of reports observed before $X_t$, $f(X_s, a_s \mid X_{r \leq t}, a_{r \leq t}) \mid X_{r \leq t-1}, y, a_{\{r \leq t\} \cup S}$ represents the scoring rule given a lie, and $f(X_s, a_s \mid X_{r \leq t}, a_{r \leq t}) \mid X_{r \leq t-1}, X_t, a_{\{r \leq t\} \cup S}$ represents the scoring rule given a truth;

$$T_t(S) := -\frac{\partial^2}{\partial y^2} E\left[\sum_{s \in S} f(X_s, a_s \mid X_{r \leq t}, a_{r \leq t}) \mid X_{r \leq t-1}, y, a_{\{r \leq t\} \cup S}\right]_{y = X_t} ; \text{ and}$$

$$T_t(S) := -\sum_{s \in S} \sum_i w_i \frac{\partial^2}{\partial y_i^2} E[f(X_s, a_s \mid X_{r \leq t}, a_{r \leq t}) \mid X_{r \leq t-1}, y, a_{\{r \leq t\} \cup S}]_y = X_t$$

where $X_s$ is a most recent report, $X_{r \leq t}$ is a sequence of reports up to and including $X_t$, and $X_{r \leq t-1}$ is a sequence of reports observed before $X_t$, and $w_i$ represents a weight in a set of weights for the report.

* * * * *